(12) United States Patent
Owada

(10) Patent No.: US 10,508,787 B2
(45) Date of Patent: Dec. 17, 2019

(54) VEHICLE LIGHTING MODULE WITH OVERLAPPING LIGHT PATTERNS

(71) Applicant: Stanley Electric Co., Ltd., Tokyo (JP)

(72) Inventor: Ryotaro Owada, Kawasaki (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 200 days.

(21) Appl. No.: 15/601,131

(22) Filed: May 22, 2017

(65) Prior Publication Data
US 2017/0343174 A1 Nov. 30, 2017

(30) Foreign Application Priority Data
May 24, 2016 (JP) .................................. 2016-103348

(51) Int. Cl.
| | |
|---|---|
| *F21S 41/40* | (2018.01) |
| *B60Q 1/06* | (2006.01) |
| *F21V 5/04* | (2006.01) |
| *F21S 41/43* | (2018.01) |
| *F21Y 115/30* | (2016.01) |

(52) U.S. Cl.
CPC .............. *F21S 41/40* (2018.01); *B60Q 1/06* (2013.01); *F21V 5/04* (2013.01); *F21S 41/43* (2018.01); *F21Y 2115/30* (2016.08)

(58) Field of Classification Search
CPC .... F21S 41/40–435; F21S 45/47; B60Q 1/06; F21V 5/04
See application file for complete search history.

(56) References Cited

U.S. PATENT DOCUMENTS

| | | | | |
|---|---|---|---|---|
| 7,699,513 B2* | 4/2010 | Nakada | ................. | F21S 41/147 362/538 |
| 7,744,261 B2* | 6/2010 | Fukawa | ................. | F21S 41/143 362/543 |
| 2007/0103923 A1 | 5/2007 | Fukawa et al. | | |
| 2009/0097268 A1* | 4/2009 | Mochizuki | ............ | F21S 41/147 362/538 |
| 2010/0309679 A1* | 12/2010 | Yamagata | ............. | F21S 41/147 362/539 |

FOREIGN PATENT DOCUMENTS

| | | |
|---|---|---|
| DE | 102006052749 A1 | 5/2007 |
| EP | 1980787 A1 | 10/2008 |
| JP | 5406566 B2 | 2/2014 |

OTHER PUBLICATIONS

The extended European Search Report for the related European Patent Application No. 17172094.9 dated Oct. 30, 2017.

* cited by examiner

*Primary Examiner* — Britt D Hanley
*Assistant Examiner* — Michael Chiang
(74) *Attorney, Agent, or Firm* — Kenealy Vaidya LLP

(57) ABSTRACT

A vehicle lighting module includes first and second optical units, each having a light source and a light distribution forming portion configured to control an optical path of light emitted from the light source. The first and second optical units are configured to form first and second light distribution patterns in front, respectively. Horizontal illumination widths of the first and second light distribution patterns are substantially equal. Each of the first and second light distribution patterns has a horizontally extending cutoff line at at least a part of an end edge of one of upper and lower sides thereof. The cutoff line of the first light distribution pattern is positioned at the one of the upper and lower sides of the cutoff line of the second light distribution pattern.

4 Claims, 7 Drawing Sheets ic # VEHICLE LIGHTING MODULE WITH OVERLAPPING LIGHT PATTERNS

BACKGROUND OF THE INVENTION

Field of the Invention

The present invention relates to a vehicle lighting module.
Priority is claimed on Japanese Patent Application No. 2016-103348, filed May 24, 2016, the content of which is incorporated herein by reference.

Description of Related Art

A vehicle headlamp (i.e., a vehicle lighting module) which includes a plurality of optical units with different illumination ranges and forms a desired light distribution pattern by overlapping the illumination ranges of the optical units is known (Japanese Patent No. 5406566).

SUMMARY OF THE INVENTION

For the vehicle lighting module described in Japanese Patent No. 5406566, it is difficult to realize a unified design since the external appearances of the optical units are different. In addition, since the optical units have different illumination ranges, illuminations of the optical units appear differently depending on the viewing direction, thus degrading the appearance.

To overcome this problem, making illumination ranges of the optical units the same can be considered. However, when illumination ranges of a plurality of optical units are made exactly the same, there arises a need to accurately overlap light distribution patterns formed by the optical units to obtain a desired light distribution pattern. Thus, there is a need to increase the processing or assembly accuracy of parts, which increases the manufacturing cost.

It is an object of the present invention to provide a vehicle lighting module which realizes a unified design without requiring strict position adjustment, thereby achieving a reduction in manufacturing cost.

A vehicle lighting module according to one aspect of the present invention includes first and second optical units, each having a light source and a light distribution forming portion configured to control an optical path of light emitted from the light source, wherein the first and second optical units are configured to form first and second light distribution patterns in front, respectively, horizontal illumination widths of the first and second light distribution patterns are substantially equal, each of the first and second light distribution patterns has a horizontally extending cutoff line at at least a part of an end edge of one of upper and lower sides thereof, and the cutoff line of the first light distribution pattern is positioned at the one of the upper and lower sides of the cutoff line of the second light distribution pattern.

According to this configuration, a desired combined light distribution pattern can be formed by overlapping the first and second light distribution patterns. In addition, the cutoff line of the second light distribution pattern can be positioned inside the combined light distribution pattern. Therefore, there is no need to perform strict vertical position adjustment of the cutoff line of the second light distribution pattern. Accordingly, when the second optical unit which forms the second light distribution pattern is manufactured, strict position accuracy in the vertical direction is not required for the second optical unit and thus it is possible to achieve a reduction in manufacturing cost.

In addition, according to this configuration, horizontal illumination widths of the first and second light distribution patterns are substantially equal. Thus, it is possible to substantially unify the external appearances of the optical units. In addition, while the first and second optical units are lit, their illumination states are substantially equal when viewed from various horizontal directions. That is, it is possible to realize a vehicle lighting module with an improved design.

The above vehicle lighting module may also be configured such that the first light distribution pattern has, at the end edge of the one of the upper and lower sides thereof, two cutoff lines which are positioned at left and right sides of an illumination center and are formed at different vertical levels, the second light distribution pattern has, at the end edge of the one of the upper and lower sides thereof, two cutoff lines which are positioned at left and right sides of the illumination center and are formed at different vertical levels along the end edge of the one of the upper and lower sides of the first light distribution pattern, and one or both of the cutoff lines of the first light distribution pattern is positioned at the one of the upper and lower sides of the cutoff lines of the second light distribution pattern.

According to this configuration, each of the end edges of the one of the upper and lower sides of the first and second light distribution patterns is stepped and overlapping the first and second light distribution patterns makes it possible to form a combined light distribution pattern which has cutoff lines formed at different levels while securing sufficient overall brightness.

In addition, according to this configuration, at least a partial cutoff line of an upper end edge of a combined light distribution pattern can be defined by the cutoff line of the first light distribution pattern and a part of the upper end edge of the second light distribution pattern can be positioned inside the combined light distribution pattern. This eliminates the need to strictly set vertical position accuracy of the second light distribution pattern and thus strict vertical position accuracy of the second optical unit is not required and it is possible to achieve a reduction in manufacturing cost.

The above vehicle lighting module may be configured such that a straight cutoff line is formed at the end edge of the one of the upper and lower sides of the first light distribution pattern, the second light distribution pattern has, at the end edge of the one of the upper and lower sides thereof, two cutoff lines which are positioned at left and right sides of an illumination center and are formed at different vertical levels, and the cutoff line of the first light distribution pattern is positioned at the one of the upper and lower sides of the cutoff lines of the second light distribution pattern.

According to this configuration, a part of a cutoff line of a combined light distribution pattern can be defined by the straight cutoff line of the first light distribution pattern and a part of the upper end edge of the second light distribution pattern can be positioned inside the combined light distribution pattern. This eliminates the need to strictly set vertical position accuracy of the second light distribution pattern and thus strict vertical position accuracy of the second optical unit is not required and it is possible to achieve a reduction in manufacturing cost. In addition, the first light distribution pattern has the straight cutoff line and therefore there is no need to strictly set lateral position accuracy of the first light distribution pattern. Accordingly, strict position accuracy in the lateral direction is not required for the first optical unit which forms the first light distribution pattern and thus it is possible to achieve a reduction in manufacturing cost.

The above vehicle lighting module may also be configured such that the first light distribution pattern has, at the end edge of the one of the upper and lower sides thereof, two cutoff lines which are positioned at left and right sides of an illumination center and are formed at different vertical levels, a straight cutoff line is formed at the end edge of the one of the upper and lower sides of the second light distribution pattern, and the two cutoff lines of the first light distribution pattern are positioned at the one of the upper and lower sides of the cutoff line of the second light distribution pattern.

According to this configuration, an upper end edge of a combined light distribution pattern can be defined by the two cutoff lines of the first light distribution pattern and there is no need to strictly set vertical position accuracy of the second light distribution pattern. In addition, the second light distribution pattern has a straight cutoff line and therefore there is no need to strictly set lateral position accuracy of the second light distribution pattern. Accordingly, strict position accuracy in the vertical and lateral directions is not required for the second optical unit which forms the second light distribution pattern and thus it is possible to achieve a reduction in manufacturing cost.

The above vehicle lighting module may also be configured such that the light distribution forming portion has a light blocking portion configured to form the cutoff line by blocking a part of an optical path of light, and the light blocking portion of the first optical unit is formed at a position lower than the light blocking portion of the second optical unit.

According to this configuration, it is possible to form a cutoff line of the first light distribution pattern which is positioned at the one of the upper and lower sides of the cutoff line of the second light distribution pattern.

The above vehicle lighting module may also be configured such that the cutoff line is formed at an upper end edge of each of the first and second light distribution patterns, and a light distribution pattern for a low beam is formed by overlapping the light distribution patterns of the first and second optical units.

According to this configuration, a light distribution pattern for a low beam which realizes a passing light distribution can be formed using a combined light distribution pattern formed by overlapping the first and second light distribution patterns.

As can be seen from the above description, according to one aspect of the present invention, it is possible to provide a vehicle lighting module which realizes a unified design and does not need strict position adjustment, thereby achieving a reduction in manufacturing cost.

DETAILED DESCRIPTION OF THE INVENTION

Figure 1:
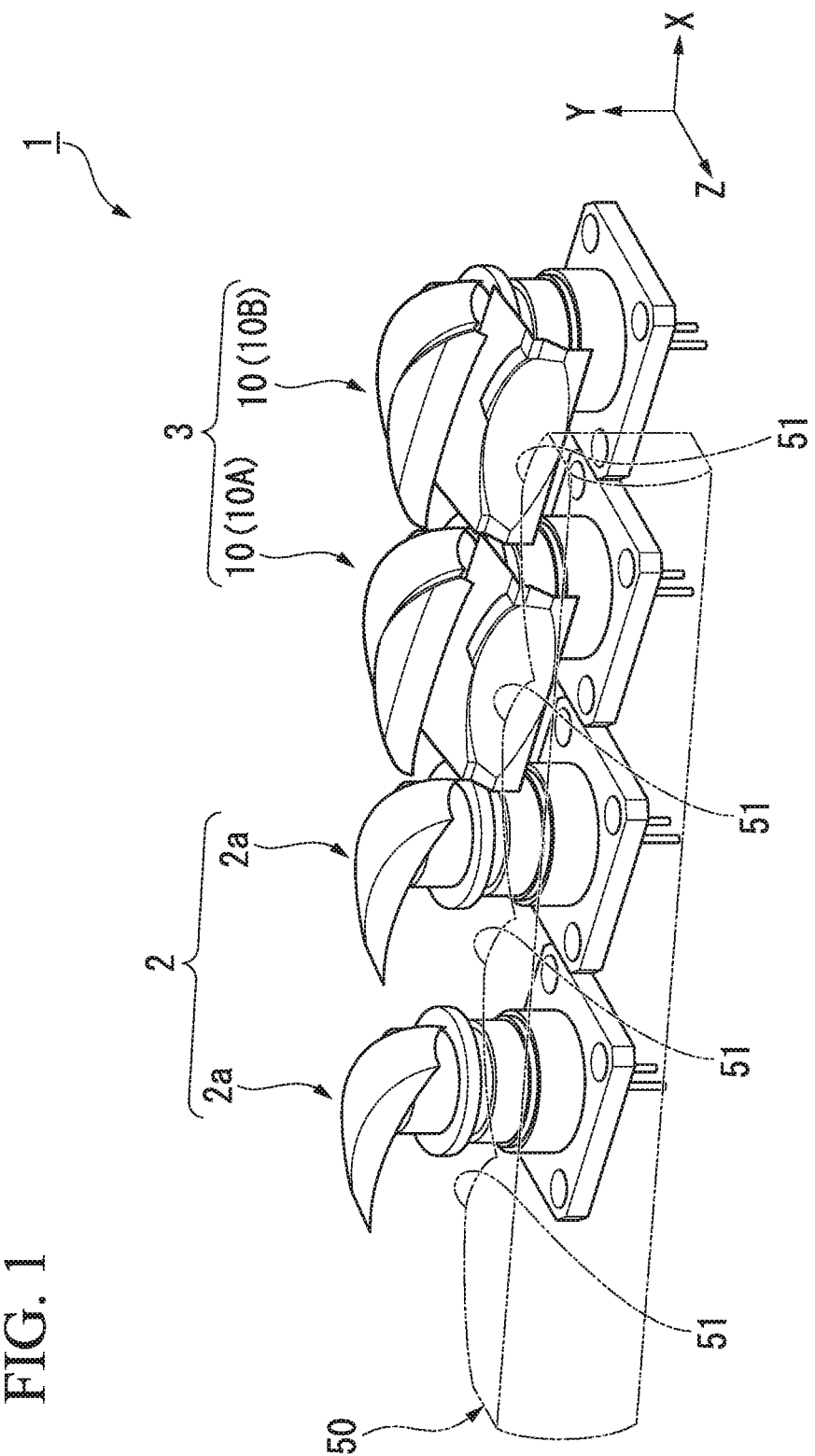
FIG. 1 is a perspective view of a vehicle lighting module in a first embodiment.

Embodiments of the present invention will hereinafter be described with reference to the drawings.

In the drawings used for the following description, some elements are shown at different scales for ease of viewing and the dimensional ratios or the like of elements may be different from the actual ones.

First Embodiment

A vehicle lighting module 1 of a first embodiment of the present invention will now be described with reference to the drawings.

FIG. 1 is a perspective view of the vehicle lighting module 1 of the first embodiment. The vehicle lighting module 1 is one of a pair of headlamps mounted on the left and right sides of a left-side traveling vehicle and only light source portions and optical parts (such as lenses and reflectors) thereof are shown.

An XYZ coordinate system is used as a 3-dimensional orthogonal coordinate system in some of the drawings used to explain the present embodiment. In the XYZ coordinate system, the Z-axis direction is a direction parallel to the optical axis of the vehicle lighting module 1, the X-axis direction is a direction parallel to the lateral direction of a vehicle on which the vehicle lighting module 1 is mounted, and the Y-axis direction is a direction perpendicular to both the Z-axis and X-axis directions. The Z-axis direction will sometimes be referred to as a "fore-aft direction of the vehicle," the X-axis direction a "lateral direction of the vehicle," the Y-axis direction a "vertical direction of the vehicle," the +Z side a "front side of the vehicle," the −Z side a "rear side of the vehicle," the +Y side just an "upper side," and the −Y side a "lower side."

The vehicle lighting module 1 has a high beam optical module 2 and a low beam optical module 3. The high beam optical module 2 forms a light distribution pattern for a high beam and the low beam optical module 3 forms a light distribution pattern for a low beam. The high beam optical module 2 has two optical units 2a. The low beam optical module 3 has two optical units 10 (i.e., a first optical unit 10A and a second optical unit 10B).

The vehicle lighting module 1 is attached to the vehicle through an optical axis adjusting function which can adjust the illumination direction in the vertical and lateral directions.

The low beam optical module 3 of the vehicle lighting module 1 (hereinafter referred to simply as an "optical module") will now be described in detail.

Figure 2:
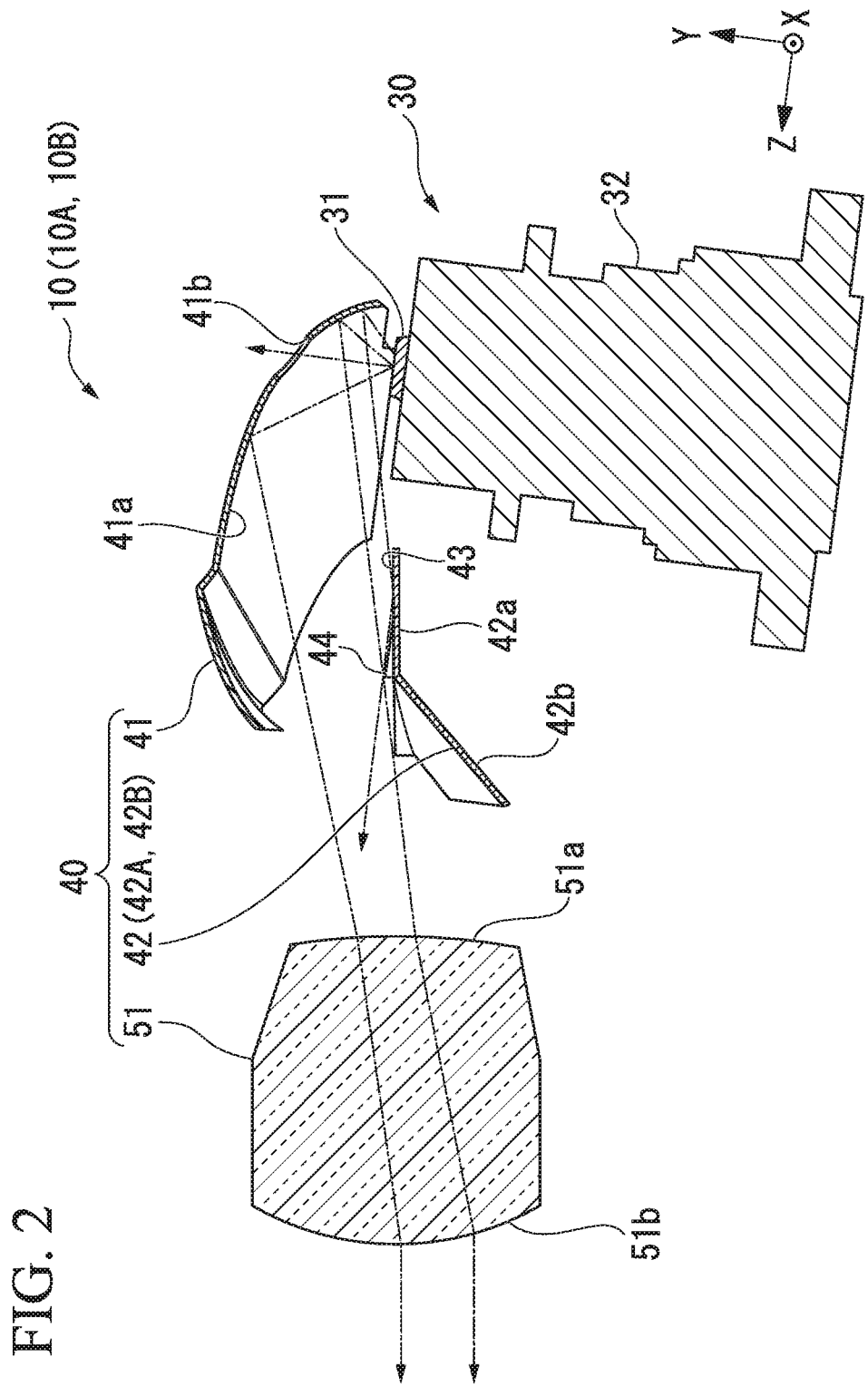
FIG. 2 is a cross-sectional view of an optical unit in the first embodiment.

FIG. 2 is a cross-sectional view taken along the fore-aft and vertical directions of one of the first and second optical units 10A and 10B of the optical module 3. Here, each of the first and second optical units 10A and 10B will be described simply as an optical unit 10 without distinguishing therebetween.

The optical unit 10 has a light source device 30 and a light distribution forming portion 40.

Although not shown here, the optical unit 10 has a heat dissipation structure, an optical detection device, and a control device. The heat dissipation structure dissipates heat generated by the light source device 30. The optical detection device detects failure of the light source device 30 by detecting part of light emitted by the light source device 30. The control device includes, for example, a control circuit such as an ECU to control the elements described above (for example, the light source device 30 and the optical detection device).

The light source device 30 is a laser light emitting device that converts laser light into white light and emits the white light. The light source device 30 has a semiconductor laser device (not shown), a focusing lens (not shown), a phosphor (light source) 31, and a holder member 32 that holds these elements. The semiconductor laser device is a semiconductor laser light source such as a laser diode that emits laser light in a blue range. The focusing lens focuses laser light from the semiconductor laser device. The phosphor 31 receives laser light focused by the focusing lens and converts at least a part of the laser light into light of a different wavelength. More specifically, the phosphor 31 converts laser light in a blue range into yellow light. Yellow light into which laser light has been converted through the phosphor 31 is mixed with laser light in a blue range which has passed through the phosphor 31 and the mixed light is emitted as white light (pseudo-white light). Thus, the phosphor 31 functions as a light source which emits white light. Hereinafter, the phosphor 31 will also be referred to as a light source 31.

The light distribution forming portion 40 controls a light path of light emitted from the light source 31. This allows light emitted from the optical unit 10 to be controlled such that light distribution patterns PA and PB (see FIG. 6) are formed in front of the optical unit 10.

The light distribution forming portion 40 has a reflector 41, a shade member 42, and a lens portion 51. Light emitted from the light source 31 is reflected by the reflector 41 such that the light is emitted forward. The light is then incident on the lens portion 51 after being partially reflected or blocked by the shade member 42. The lens portion 51 has an incident surface 51a which faces rearward and an emitting surface 51b which faces forward. The lens portion 51 emits light, which has been received through the incident surface 51a, forward through the emitting surface 51b. As shown in FIG. 1, lens portions 51 of a plurality of adjacent optical units 10 and 2a constitute a series of lens bodies 50.

The reflector 41 has a reflective surface 41a which reflects light from the light source 31 forward from the vehicle. A reflective film for reflecting light with high efficiency is formed on the reflective surface 41a. The reflective surface 41a is formed, for example, in the shape of a paraboloid with the light source 31 as a focal point. The reflector 41 has a through-hole 41b which is formed at a portion of the reflective surface 41a corresponding to the optical axis of the light source device 30. The through-hole 41b passes laser light therethrough when the phosphor 31 has been detached or lost from the light source device 30. By forming the through-hole 41b, it is possible to prevent laser light from being emitted forward when the phosphor 31 has been detached or lost.

The shade member 42 is disposed in front of the light source 31 of the light source device 30.

Figure 3:
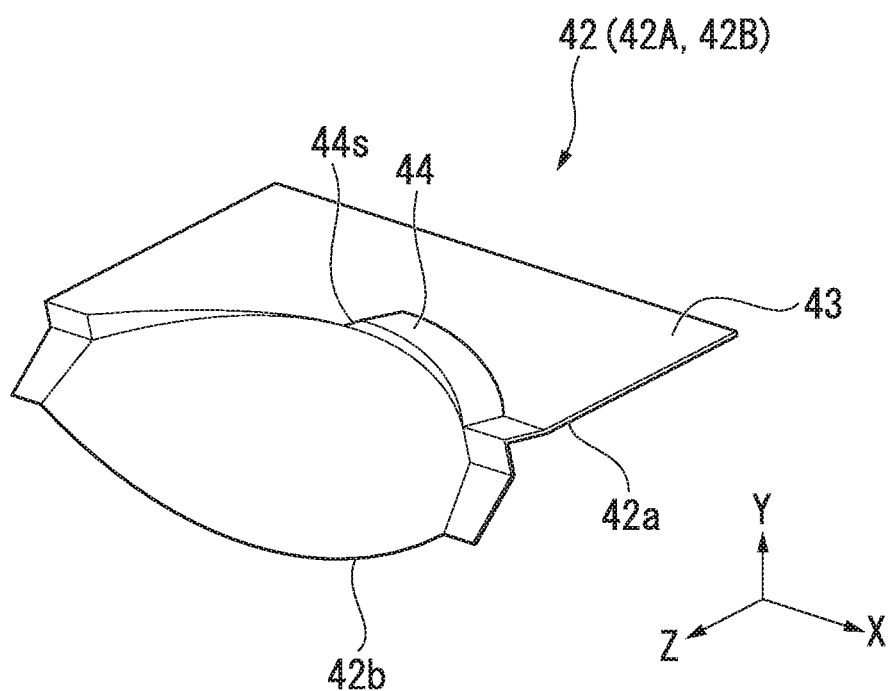
FIG. 3 is a perspective view of a shade member of an optical unit in the first embodiment.

FIG. 3 is a perspective view of the shade member 42 of the optical unit 10. As shown in FIGS. 2 and 3, the shade member 42 has a first plate portion 42a which is in the shape of a plate which extends in the fore-aft direction and a second plate portion 42b that is inclined downward and extends forward from a front end edge of the first plate portion 42a. A reflective surface 43 is formed on the top surface of the first plate portion 42a of the shade member 42. A reflective film for reflecting light with high efficiency is formed on the reflective surface 43. Part of light which is directed downward after being reflected by the reflector 41 is reflected upward by the reflective surface 43. A light blocking portion 44 is also provided at a front end edge of the reflective surface 43. The light blocking portion 44 blocks part of a light distribution which is formed by reflection by the reflector 41.

The shade members 42 of the first and second optical units 10A and 10B have different shapes. Here, the shade members 42 of the first and second optical units 10A and 10B are referred to as shade members 42A and 42B, respectively.

Figure 4:
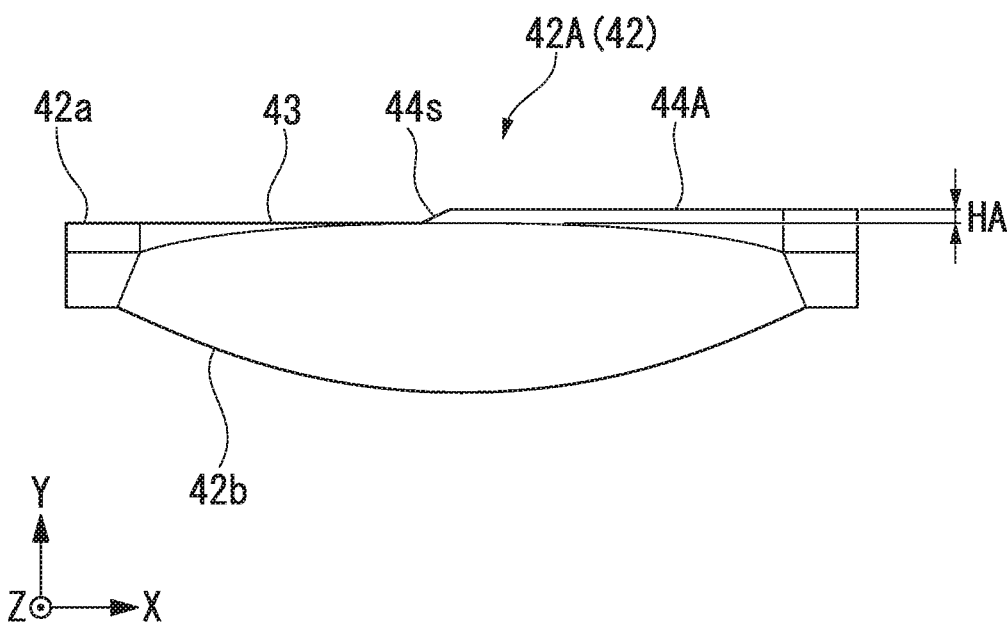
FIG. 4 is a front elevation view of a shade member of a first optical unit in the first embodiment.
Figure 5:
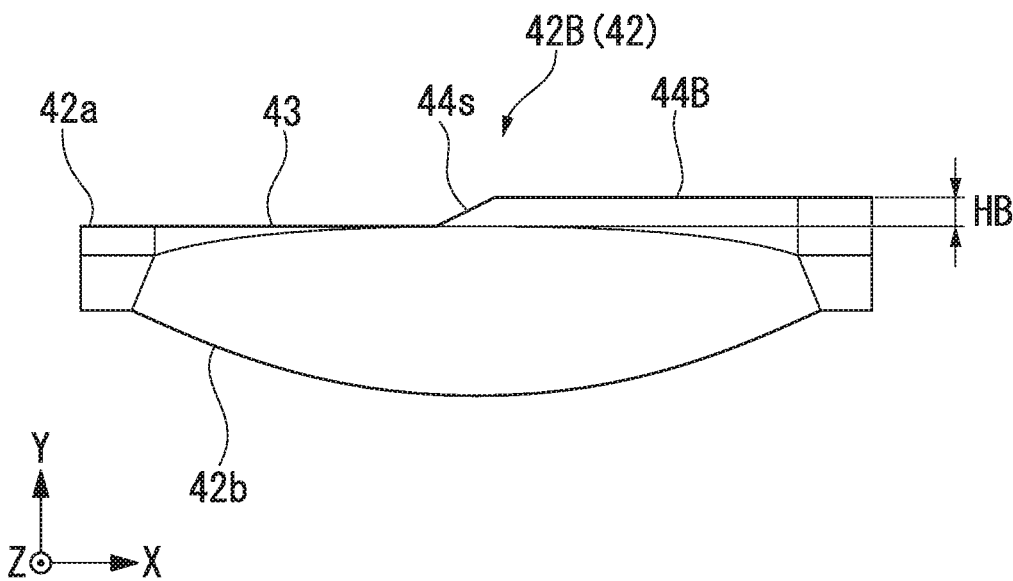
FIG. 5 is a front elevation view of a shade member of a second optical unit in the first embodiment.

FIG. 4 is a front elevation view of the shade member 42A of the first optical unit 10A. FIG. 5 is a front elevation view of the shade member 42B of the second optical unit 10B. The front elevation views of FIGS. 4 and 5 are views of the shade members 42A and 42B from the front of the vehicle.

The shade members 42A and 42B of the first and second optical units 10A and 10B have light blocking portions 44A and 44B of different heights. More specifically, the height of the light blocking portion 44A of the first optical unit 10A is lower than that of the light blocking portion 44B of the second optical unit 10B (i.e., height HA<height HB in FIGS. 4 and 5). This makes it possible to form a first cutoff line CLA1 of a first light distribution pattern PA positioned above (or positioned at one of the upper and lower sides of) a first cutoff line CLB1 of a second light distribution pattern PB as will be described later (see FIG. 6c).

Light distribution patterns PA and PB formed by the first and second optical units 10A and 10B will now be described.

Figure 6A:
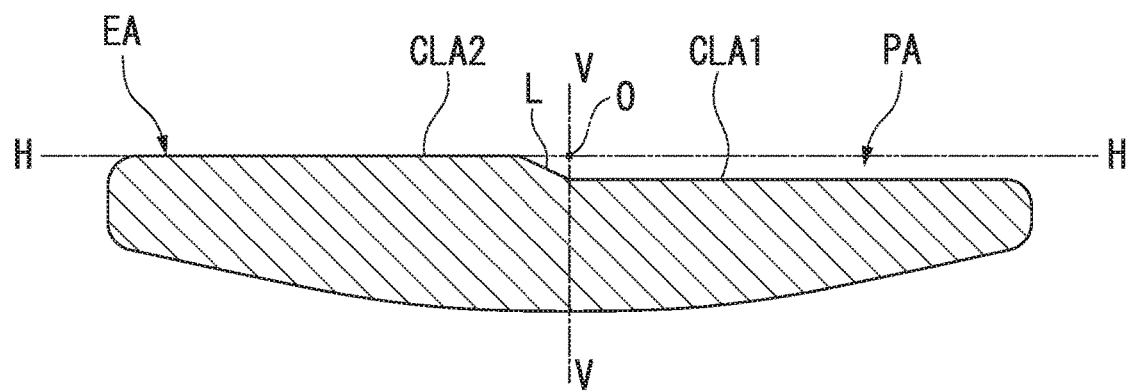
FIGS. 6a to 6c are schematic views of a first light distribution pattern, a second light distribution pattern, and a combined light distribution pattern in the first embodiment.
Figure 6B:
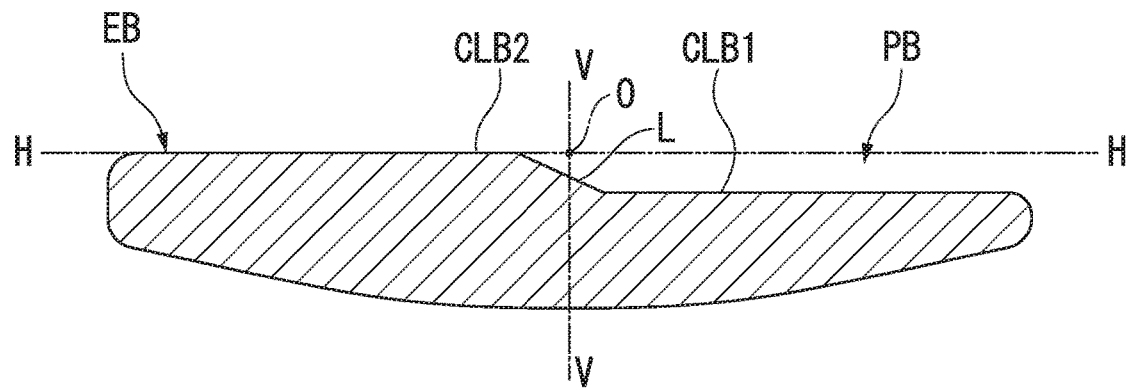
Figure 6C:
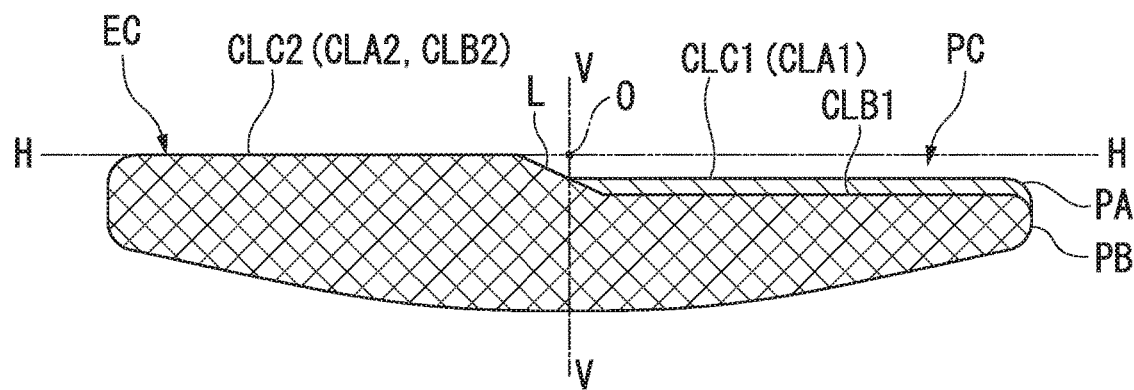

FIG. 6a is a schematic view of the first light distribution pattern PA formed by the first optical unit 10A. FIG. 6b is a schematic view of the second light distribution pattern PB formed by the second optical unit 10B. FIG. 6c is a schematic view of a combined light distribution pattern PC formed by overlapping the first and second light distribution patterns PA and PB. An illumination center O of the vehicle lighting module 1 and a vertical line V-V and a horizontal line H-H which pass through the illumination center O are shown in FIGS. 6a to 6c. The illumination center O is the intersection point of an optical axis of the vehicle lighting module 1, which is formed by extending the center of the vehicle in the fore-aft direction and parallel to the horizontal direction, and a screen on which the light distribution patterns PA, PB, and PC are formed.

As shown in FIG. 2, in each of the first and second optical units 10A and 10B, light emitted from the light source 31 is reflected forward by the reflector 41 and passes through the lens portion 51 and is then emitted therefrom. Between the reflector 41 and the lens portion 51, the reflective surface 43 of the shade member 42 reflects light directed downward of the incident surface 51a of the lens portion 51 to increase the efficiency of use of light. Between the reflector 41 and the lens portion 51, the light blocking portion 44 of the shade member 42 blocks a lower end of the light distribution. Optical paths of light cross in vertical and horizontal planes after passing through the lens portion 51. Accordingly, a light distribution pattern illuminated on a front screen which is spaced far enough from the lens portion 51 is a vertically and horizontally inverted version of a light distribution pattern at the rear side of the lens portion 51. A lower end edge of the light distribution formed by the reflective surface 43 and the light blocking portion 44 becomes an upper end edge on the front screen. That is, the reflective surfaces 43 and the light blocking portions 44 form upper end edges EA and EB of light distribution patterns PA and PB.

As shown in FIG. 6a, a light distribution pattern (hereinafter referred to as a first light distribution pattern) PA of the first optical unit 10A has two cutoff lines (i.e., a first cutoff line CLA1 and a second cutoff line CLA2) at an upper end edge (or at an end edge of the one of the upper and lower sides) EA thereof. The first and second cutoff lines CLA1 and CLA2 are positioned at left and right sides of the illumination center O and are formed at different vertical levels. The first cutoff line CLA1 is positioned below the second cutoff line CLA2 (or positioned at the other of the upper and lower sides of the second cutoff line CLA2). The first cutoff line CLA1 is formed in correspondence with light blocking by the light blocking portion 44. The second cutoff line CLA2 is formed in correspondence with the front end edge of the reflective surface 43.

An inclined line L is formed between the first cutoff line CLA1 and the second cutoff line CLA2. The inclined line L is formed to overlap with the vertical line V-V that passes through the illumination center O of the first optical unit 10A. The inclined line L is formed in correspondence with an inclined portion 44s of the light blocking portion 44 (44A, 44B), which is tilted near the center of the optical unit (see FIGS. 4 and 5).

As shown in FIG. 6b, the upper end edge EB of the light distribution pattern (hereinafter referred to as a second light distribution pattern) PB of the second optical unit 10B is formed along the end edge of the one of the upper and lower sides of the first light distribution pattern. Similar to the first light distribution pattern PA, the second light distribution pattern has a first cutoff line CLB1 and a second cutoff line CLB2 at the upper end edge EB thereof.

The difference in vertical position between the two cutoff lines CLA1 and CLA2 of the first light distribution pattern PA is smaller than the difference in vertical position between the two cutoff lines CLB1 and CLB2 of the second light distribution pattern PB. This is because the light blocking portion 44A of the first optical unit 10A is formed at a position lower than the light blocking portion 44B of the second optical unit 10B (see FIGS. 4 and 5).

The light distribution forming portions 40 of the first and second optical units 10A and 10B have the same configuration, except for the configuration of the light blocking portions 44. Thus, horizontal illumination widths of the first and second light distribution patterns PA and PB are substantially equal.

As shown in FIG. 6c, the first and second light distribution patterns PA and PB overlap with each other to form a combined light distribution pattern PC. In the present embodiment, the combined light distribution pattern PC is a light distribution pattern for a low beam (i.e., a passing light distribution pattern).

First and second cutoff lines CLC1 and CLC2 are formed at an upper end edge EC of the combined light distribution pattern PC at the left and right sides of the illumination center O of the vehicle lighting module 1, respectively.

The first cutoff line CLC1 of the combined light distribution pattern PC is formed at a right side in the travel direction which is a light distribution region that illuminates an oncoming traffic lane. The position of the first cutoff line CLC1 needs strict position adjustment such that light emitted from the vehicle lighting module 1 does not cause glare to oncoming vehicles. The meeting point of the cutoff line CLA1 and the inclined line L is a reference for aim of the vehicle lighting module. For example, the reference for aim is appropriately adjusted to about 0.6° downward from the illumination center O (which is the intersection point of the V-V line and the H-H line).

The first cutoff line CLA1 of the first light distribution pattern PA is positioned above the upper end edge EB of the second light distribution pattern PB (or positioned at the one of the upper and lower sides of the upper end edge EB). Therefore, the first cutoff line CLC1 of the combined light distribution pattern PC originates from the first cutoff line CLA1 of the first light distribution pattern PA. The first cutoff line CLA1 of the first light distribution pattern PA is strictly adjusted in position to sufficiently illuminate the oncoming traffic lane without causing glare to oncoming vehicles. On the other hand, the first cutoff line CLB1 of the second light distribution pattern PB is positioned below the first cutoff line CLA1 of the first light distribution pattern. Accordingly, the vertical position of the first cutoff line CLB1 of the second light distribution pattern PB has a tolerance allowed within a range not exceeding the first cutoff line CLA1 of the first light distribution pattern PA and does not need strict position adjustment. Employing the combined light distribution pattern PC of the present embodiment eliminates the need to increase the processing or assembly accuracy of parts which constitute the second light source unit in the vertical direction of the second light distribution pattern PB and thus makes it possible to provide an inexpensive vehicle lighting module 1.

The second cutoff line CLC2 of the combined light distribution pattern PC is formed at a left side in the travel direction which is a light distribution region that mainly illuminates a travel lane of the vehicle on which the vehicle lighting module 1 is mounted. The second cutoff line CLC2 is formed along the horizontal line H-H.

In the combined light distribution pattern PC shown in FIG. 6c, the second cutoff line CLA2 of the first light distribution pattern PA coincides with the second cutoff line CLB2 of the second light distribution pattern PB. However, the second cutoff line CLA2 of the first light distribution pattern PA may be positioned above or below the upper end edge EB of the second light distribution pattern PB.

According to the present embodiment, the first cutoff line CLA1 of the first light distribution pattern PA is positioned above the upper end edge EB of the second light distribution pattern PB and thus it is possible to position the first cutoff line CLB1 of the second light distribution pattern PB inside the combined light distribution pattern. Therefore, there is no need to perform strict vertical position adjustment of the first cutoff line CLB1 of the second light distribution pattern PB. That is, strict position accuracy in the vertical direction is not required for the second optical unit 10B when it is manufactured and thus it is possible to achieve a reduction in manufacturing cost.

According to the present embodiment, horizontal illumination widths of the first and second light distribution patterns PA and PB are substantially equal. Thus, it is possible to substantially unify the external appearances of the optical units. In addition, while the first and second optical units 10A and 10B are lit, their illumination states are substantially equal when viewed from various horizontal directions. That is, it is possible to realize a vehicle lighting module with an improved design.

According to the present embodiment, each of the upper end edges (or each of the end edges of the one of the upper and lower sides) EA and EB of the first and second light distribution patterns PA and PB is stepped. Accordingly, overlapping the first and second light distribution patterns PA and PB makes it possible to form a combined light distribution pattern which has first and second cutoff lines CLC1 and CLC2 formed at different levels while securing sufficient overall brightness.

Second Embodiment

A vehicle lighting module of a second embodiment will now be described with reference to the drawings. The vehicle lighting module of the second embodiment has substantially the same configuration as that of the first embodiment described above but with different configurations of light distribution patterns formed.

Figure 7A:
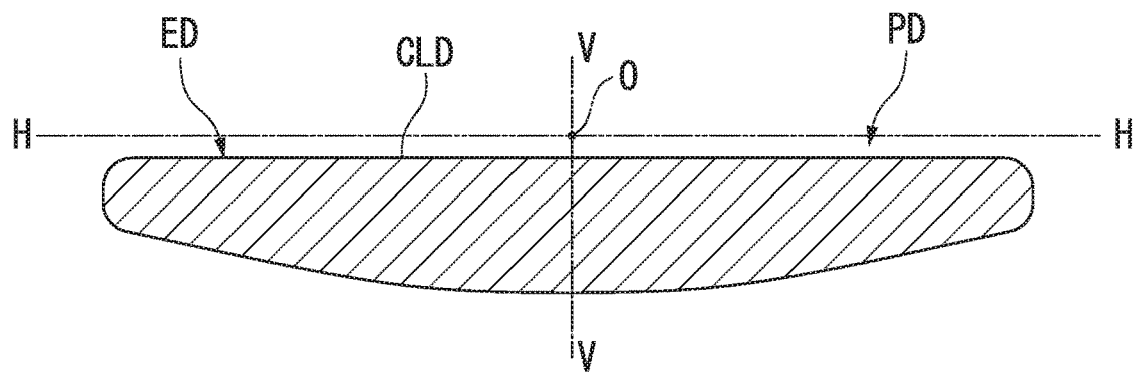
FIGS. 7a to 7c are schematic views of a first light distribution pattern, a second light distribution pattern, and a combined light distribution pattern in a second embodiment.
Figure 7B:
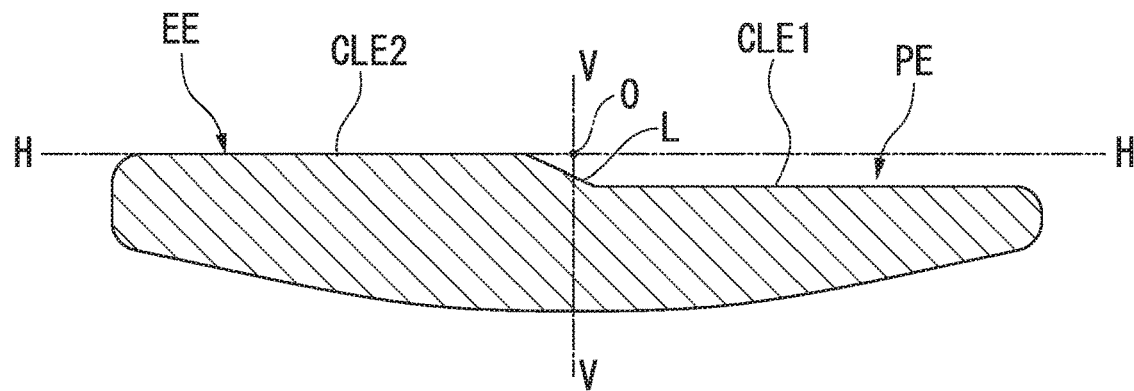
Figure 7C:
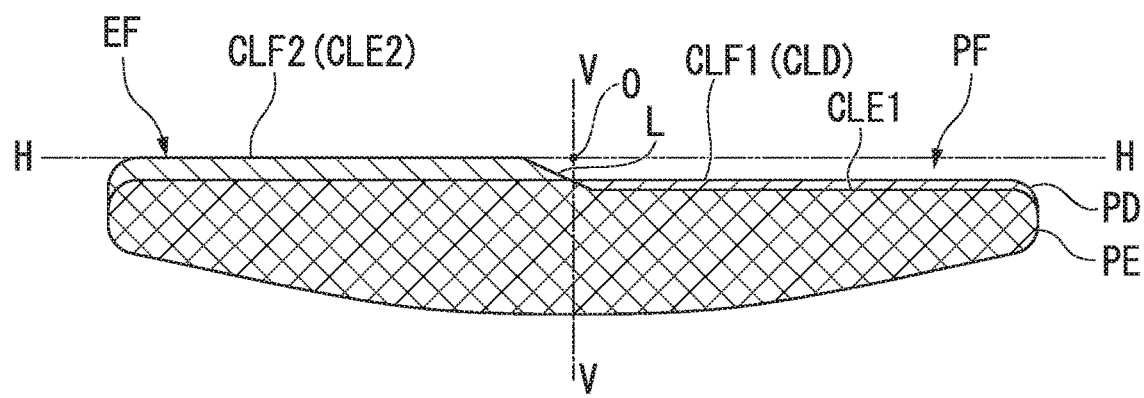

FIGS. 7a and 7b are schematic views showing light distribution patterns PD and PE formed by two optical units (corresponding to the first and second optical units 10A and 10B of FIG. 1), respectively, of the vehicle lighting module of the second embodiment. FIG. 7c is a schematic view of a combined light distribution pattern PF formed by overlapping the light distribution patterns PD and PE. Elements similar to those of the above embodiment are denoted by the same reference numbers and descriptions thereof are omitted here.

As shown in FIG. 7a, a straight cutoff line CLD is formed at an upper end edge (or at an end edge of one of the upper and lower sides) ED of the first light distribution pattern PD. Although not shown, the optical unit that forms the first light distribution pattern PD has a shade member with a light blocking portion (corresponding to the light blocking portion 44 of FIG. 3) formed across the entire width, which allows the straight cutoff line CLD to be formed.

As shown in FIG. 7b, the second light distribution pattern PE has a first cutoff line CLE1 and a second cutoff line CLE2 at an upper end edge (or at an end edge of one of the upper and lower sides) EE thereof. The first and second cutoff lines CLE1 and CLE2 are positioned at left and right sides of an illumination center O and are formed at different vertical levels. The first cutoff line CLE1 is positioned below the second cutoff line CLE2. An inclined line L is formed between the first cutoff line CLE1 and the second cutoff line CLE2 such that the inclined line L overlaps with a vertical line V-V that passes through the illumination center O.

Horizontal illumination widths of the first and second light distribution patterns PD and PE are substantially equal.

As shown in FIG. 7c, the first and second light distribution patterns PD and PE overlap with each other to form a combined light distribution pattern PF. In the present embodiment, the combined light distribution pattern PF is a light distribution pattern for a low beam (i.e., a passing light distribution pattern).

First and second cutoff lines CLF1 and CLF2 are formed at an upper end edge EF of the combined light distribution pattern PF at the left and right sides, respectively, of the illumination center O of the vehicle lighting module 1.

The straight cutoff line CLD of the first light distribution pattern PD is positioned above one cutoff line (i.e., a first cutoff line CLE1) of the second light distribution pattern PE.

Therefore, the first cutoff line CLF1 of the combined light distribution pattern PF originates from the cutoff line CLD of the first light distribution pattern PD. The first cutoff line CLF1 is formed at an upper end of a light distribution region that illuminates an oncoming traffic lane.

The second cutoff line CLE2 of the second light distribution pattern PE is positioned above the straight cutoff line CLD of the first light distribution pattern PD. Therefore, the second cutoff line CLF2 of the combined light distribution pattern PF originates from the second cutoff line CLE2 of the second light distribution pattern PE. The second cutoff line CLF2 is formed at an upper end of a light distribution region that illuminates the travel lane.

According to the present embodiment, it is possible to achieve the same effects as the first embodiment. That is, since the first cutoff line CLF1 of the combined light distribution pattern PF is defined by the cutoff line CLD of the first light distribution pattern PD, there is no need to perform strict vertical position adjustment of the first cutoff line CLE1 of the second light distribution pattern PE. That is, strict position accuracy in the vertical direction is not required for the second optical unit 10B when it is manufactured and thus it is possible to achieve a reduction in manufacturing cost.

In addition, according to the present embodiment, the straight cutoff line CLD is formed at the upper end edge ED of the first light distribution pattern PD. That is, the first light distribution pattern PD does not have a plurality of cutoff lines at the upper end edge ED and therefore position adjustment in the lateral direction is not required for the first light distribution pattern PD.

Accordingly, there is no need to strictly set lateral position accuracy of the first light distribution pattern PD and thus it is possible to achieve a reduction in manufacturing cost.

Third Embodiment

A vehicle lighting module of a third embodiment will now be described with reference to the drawings. The vehicle lighting module of the third embodiment has substantially the same configuration as that of the first embodiment described above but with different configurations of light distribution patterns formed.

Figure 8:
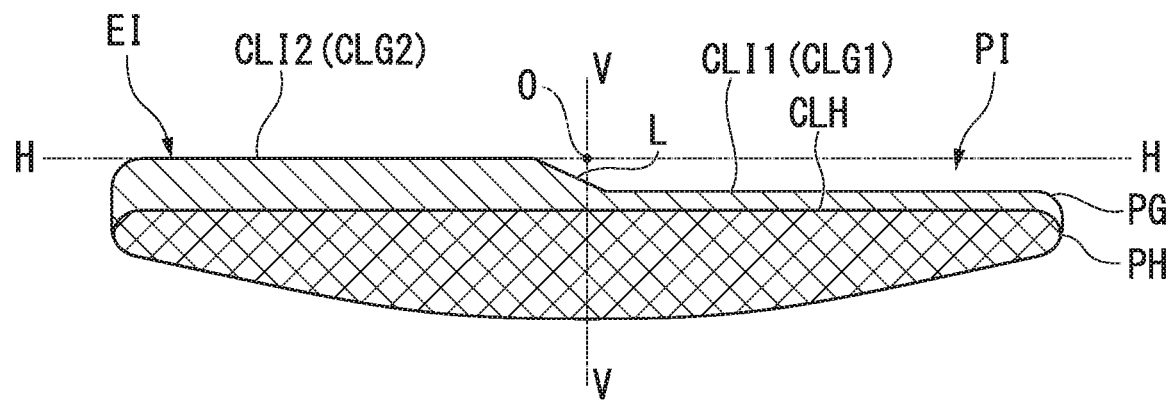
FIG. 8 is a schematic view of a combined light distribution pattern in a third embodiment.

FIG. 8 is a schematic view of a combined light distribution pattern PI formed by overlapping first and second light distribution patterns PG and PH which are formed by two optical units (corresponding to the first and second optical units 10A and 10B of FIG. 1) of the vehicle lighting module of the third embodiment. Elements similar to those of the above embodiments are denoted by the same reference numbers and descriptions thereof are omitted.

The first light distribution pattern PG has, at an upper end edge thereof, a first cutoff line CLG1 and a second cutoff line CLG2 which are formed at different vertical levels. An inclined line L is formed between the first cutoff line CLG1 and the second cutoff line CLG2 such that the inclined line L overlaps with a vertical line V-V that passes through an illumination center O.

A straight cutoff line CLH is formed at an upper end edge of the second light distribution pattern PH.

Horizontal illumination widths of the first and second light distribution patterns PG and PH are substantially equal.

The combined light distribution pattern PI is formed by overlapping the first and second light distribution patterns PG and PH. First and second cutoff lines CLI1 and CLI2 are formed at an upper end edge EI of the combined light distribution pattern PI at the left and right sides, respectively, of the illumination center O of the vehicle lighting module 1.

The upper end edge (i.e., the first and second cutoff lines CLG1 and CLG2) of the first light distribution pattern PG is positioned above the straight cutoff line CLH of the second light distribution pattern PH. Therefore, the upper end edge EI of the combined light distribution pattern PI is defined by the first and second cutoff lines CLG1 and CLG2 of the first light distribution pattern PG.

According to the present embodiment, it is possible to achieve the same effects as the first embodiment. That is, the upper end edge EI of the combined light distribution pattern PI can be defined by the first and second cutoff lines CLG1 and CLG2 of the first light distribution pattern PG and thus there is no need to strictly set vertical position accuracy of the second light distribution pattern PH. In addition, the second light distribution pattern PH has the straight cutoff line CLH and therefore there is no need to strictly set lateral position accuracy of the second light distribution pattern PH. Accordingly, strict position accuracy in the vertical and lateral directions is not required for the second optical unit 10B which forms the second light distribution pattern PH and thus it is possible to achieve a reduction in manufacturing cost.

Fourth Embodiment

A vehicle lighting module of a fourth embodiment will now be described with reference to the drawings. The vehicle lighting module of the fourth embodiment has substantially the same configuration as that of the first embodiment described above but with three optical units and light distribution patterns formed thereby.

Figure 9:
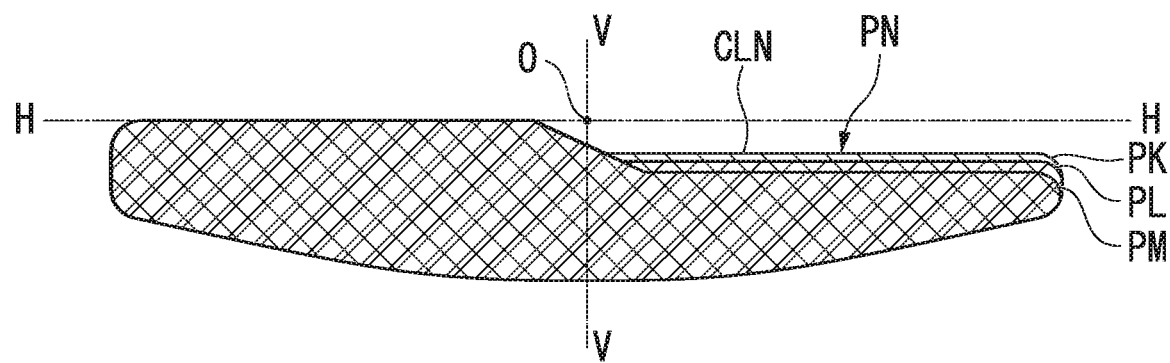
FIG. 9 is a schematic view of a combined light distribution pattern in a fourth embodiment.

FIG. 9 is a schematic view of a combined light distribution pattern PN formed by overlapping first to third light distribution patterns PK, PL, and PM which are formed by the three optical units of the vehicle lighting module of the fourth embodiment. Elements similar to those of the above embodiments are denoted by the same reference numbers and descriptions thereof are omitted.

Each of the first to third light distribution patterns PK, PL, and PM has, at an upper end edge thereof, two cutoff lines which are formed at different vertical levels. Of these cutoff lines, a cutoff line of the first light distribution pattern PK constitutes a cutoff line CLN of the combined light distribution pattern PN.

According to the present embodiment, it is possible to achieve the same effects as the above embodiments and there is no need to strictly perform position adjustment of the second and third light distribution patterns PL and PM and thus it is possible to realize an inexpensive vehicle lighting module. In addition, overlapping the three light distribution patterns PK, PL, and PM makes it possible to form a combined light distribution pattern PN with a high degree of freedom of contours and brightness distribution.

Although the present embodiment has been described with reference to an example in which a combined light distribution pattern PN is formed by overlapping three light distribution patterns PK, PL, and PM, a combined light distribution pattern may also be formed by overlapping four or more light distribution patterns.

Fifth Embodiment

A vehicle lighting module of a fifth embodiment will now be described with reference to the drawings.

The vehicle lighting module of the fifth embodiment has substantially the same configuration as that of the first embodiment described above but with a different configuration of a combined light distribution pattern.

Figure 10:
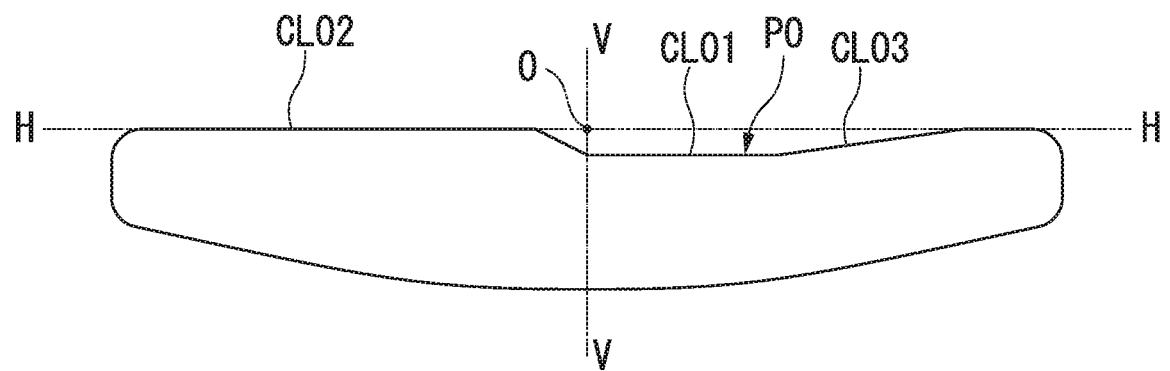
FIG. 10 is a schematic view of a combined light distribution pattern in a fifth embodiment.

FIG. 10 is a schematic view of a combined light distribution pattern PO formed by the vehicle lighting module of the fifth embodiment. Elements similar to those of the above embodiment are denoted by the same reference numbers and descriptions thereof are omitted.

The combined light distribution pattern PO of the present embodiment is a light distribution pattern for a low beam which is formed by overlapping a plurality of light distribution patterns, similar to the above embodiments. The combined light distribution pattern PO has, at an upper end edge thereof, first and second cutoff lines CLO1 and CLO2 which are formed at different vertical levels and a third cutoff line CLO3 which is tilted outward and upward from one lateral end of the first cutoff line CLO1.

The first cutoff line CLO1 is formed at an upper end of a light distribution region that illuminates an oncoming traffic lane.

The second cutoff line CLO2 is formed at an upper end of a light distribution region that illuminates a travel lane. The second cutoff line CLO2 is positioned above the first cutoff line CLO1.

The third cutoff line CLO3 is provided to illuminate a sidewalk positioned at one side of the oncoming traffic lane.

According to the combined light distribution pattern PO of the present embodiment, it is possible to illuminate a sidewalk of the oncoming traffic lane and thus to provide a vehicle lighting module which increases visibility.

A combined light distribution pattern including the third cutoff line CLO3 shown in the present embodiment may be formed by appropriately setting contours of the light distribution patterns in each of the above embodiments.

While various embodiments of the present invention have been described above, elements, combinations thereof, or the like in each embodiment are exemplary and addition, omission, replacement, and other modifications of elements are possible without departing from the spirit of the present invention. The present invention is not limited by the embodiments.

For example, although the above embodiments are exemplified by a vehicle lighting module including projector-type optical units, the optical units may be reflector-type optical units.

In addition, although the above embodiments are exemplified by examples in which the present invention is applied to optical modules that realize light distributions for low beams (i.e., passing light distributions), the present invention may also be applied to optical modules that realize light distributions for high beams. In this case, light distribution patterns have cutoff lines at lower end edges thereof.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle lighting module comprising first and second optical units, each having a light source and a light distribution forming portion configured to control an optical path of light emitted from the light source, wherein the first and second optical units are configured to form first and second light distribution patterns in front, respectively, horizontal illumination widths of the first and second light distribution patterns are substantially equal, the first light distribution pattern has a first cutoff line extending horizontally at an upper end edge of a light distribution region that illuminates an oncoming traffic lane and a second cutoff line extending horizontally at an upper end edge of a light distribution region that illuminates a travel lane, the second light distribution pattern has a first cutoff line extending horizontally at an upper end edge of a light distribution region that illuminates the oncoming traffic lane and a second cutoff line extending horizontally at an upper end edge of a light distribution region that illuminates the travel lane, the light distribution forming portion of each of the first and second optical units has a shade member configured to form the first and second cutoff lines by blocking part of an optical path of light, the shade member of the first optical unit and the shade member of the second optical unit have different shapes, the first cutoff line of the first light distribution pattern is positioned above the first cutoff line of the second light distribution pattern, and the second cutoff line of the first light distribution pattern is positioned below the second cutoff line of the second light distribution pattern.

2. The vehicle lighting module according to claim 1, wherein the first and second cutoff lines of the first light distribution pattern have the same vertical heights, and the first and second cutoff lines of the second light distribution pattern have different vertical heights.

3. The vehicle lighting module according to claim 1, wherein the shade member has a light blocking portion configured to form the cutoff line by blocking a part of an optical path of light, and the light blocking portion of the first optical unit is formed at a position lower than the light blocking portion of the second optical unit.

4. The vehicle lighting module according to claim 1, wherein a light distribution pattern for a low beam is formed by overlapping the light distribution patterns of the first and second optical units.

* * * * *